United States Patent [19]

Schütz

[11] Patent Number: 4,531,347
[45] Date of Patent: Jul. 30, 1985

[54] LAWN MOWER WITH WHEEL DRIVE

[75] Inventor: Eberhard Schütz, Daaden, Fed. Rep. of Germany

[73] Assignee: Wolf-Gerate GmbH, Fed. Rep. of Germany

[21] Appl. No.: 573,856

[22] Filed: Jan. 25, 1984

[30] Foreign Application Priority Data

Jan. 26, 1983 [DE] Fed. Rep. of Germany ....... 3302544

[51] Int. Cl.³ ............................................. A01D 75/18
[52] U.S. Cl. ...................................... 56/10.5; 56/11.8
[58] Field of Search ...................... 56/10.5, 11.3, 11.8

[56] References Cited

U.S. PATENT DOCUMENTS

| | | | |
|---|---|---|---|
| 2,298,135 | 10/1942 | Klein | 56/10.5 |
| 2,521,262 | 9/1950 | Smith | 56/10.5 |
| 2,698,507 | 1/1955 | Siebring | 56/10.5 |
| 2,702,448 | 2/1955 | Smith | 56/10.5 |
| 3,802,170 | 4/1974 | Seifert et al. | 56/11.8 |
| 3,841,069 | 10/1974 | Weck | 56/11.9 |
| 3,903,679 | 9/1975 | Sorenson et al. | 56/11.8 |
| 3,958,398 | 5/1976 | Fuelling, Jr. et al. | 56/11.8 |
| 4,090,345 | 5/1978 | Harkness | 56/10.5 |
| 4,195,466 | 4/1980 | Heismann | 56/10.5 |
| 4,212,141 | 7/1980 | Miyazawa et al. | 56/11.3 |
| 4,281,732 | 8/1981 | Hoch | 56/11.8 |
| 4,309,862 | 1/1982 | Carlson | 56/11.3 |
| 4,327,539 | 5/1982 | Bricko et al. | 56/11.3 |
| 4,335,566 | 6/1982 | Huro | 56/11.3 |
| 4,433,530 | 2/1984 | Schaefer | 56/10.5 |
| 4,466,232 | 8/1984 | Beugelsdyle et al. | 56/11.3 |

FOREIGN PATENT DOCUMENTS 2217351 10/1923 Fed. Rep. of Germany.
8108936 7/1931 Fed. Rep. of Germany.

Primary Examiner—Paul J. Hirsch
Attorney, Agent, or Firm—Ostrolenk, Faber, Gerb & Soffen

[57] ABSTRACT

In a lawn mower for wheel drive, two switch yokes 16 and 18, pivoted swingably below the handlebar 10, are provided as switch members for the turning on and disconnecting of the motor and the engagement and disengagement of the clutch respectively. The clutch switch yoke 18 is, in this connection, developed as an entrainment lever which holds the motor switch yoke 16 in engaged position after said yoke has been released. A safety button must be depressed before the swinging of the motor switch yoke 16. It is not possible to turn the motor on by means of the clutch switch yoke.

14 Claims, 5 Drawing Figures

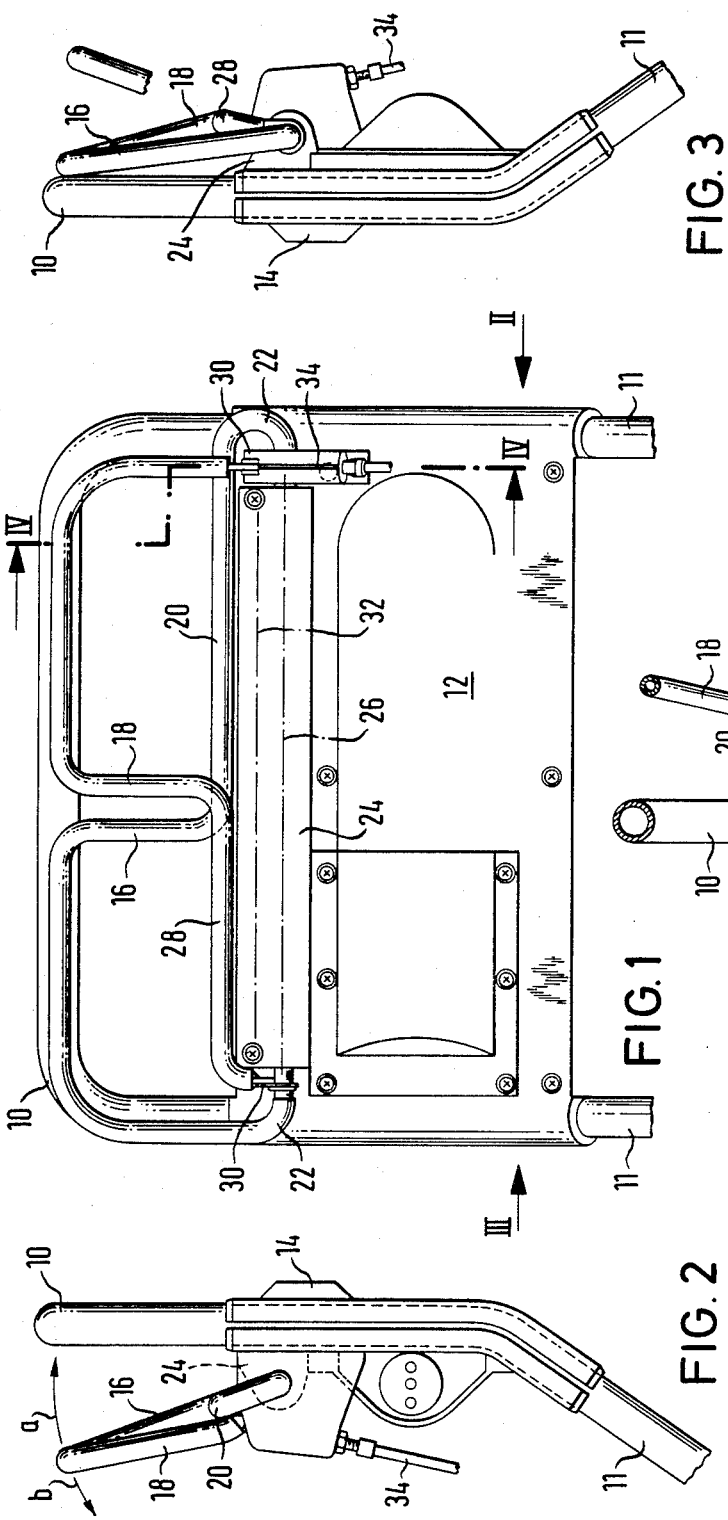

LAWN MOWER WITH WHEEL DRIVE

The present invention relates to an electric lawn mower of the type indicated in the preamble to Claim 1. Such lawn mowers, as known for instance from U.S. Pat. No. 4,212,141, have separately actuatable switch members for the drive motor and the clutch, the motor switch being adapted to be actuated by the clutch switch.

In the event of inexpert handling, this may lead to disturbances or even to dangerous situations. If the motor, namely, is connected by means of the clutch switch there is a certain abrupt start which may also lead to a stalling of the motor and damage to it. Similarly, if the motor is disconnected in the coupled condition of the clutch an undesired continued operation of the lawn mower may result.

The object of the invention is therefore to increase the ease of operation of such lawn mowers in the manner that erroneous functions are not brought about and a switching sequence can be effected only in predetermined steps, in which connection the need for safety is also taken fully into account.

This object is achieved by a motor driven lawn motor with has a motor and at least one travel means or wheel that is driven by the motor. A handlebar for being grasped by the operator is connected to the mower. There is a motor starting and operating first switch device or yoke connected with the motor and movable to a position for starting and operating the motor and to a position for stopping the motor. That first switch device is in the vicinity of the handlebar. There is a clutch from the motor to the driven wheel. There is a wheel clutch second switch device or yoke connected with the clutch for being moved to a position which activates the clutch and to a position which deactivates the clutch. The second switch device is also in the vicinity of the handlebar. Both the first and second switch devices are normally returned to their inactivated positions. The second switch device for the clutch is normally positioned for holding the first switch device for the motor in the first, motor operating position, when the second or clutch switch device is in the third or clutch activating position. The first or motor operating switch device is positioned for holding the second or clutch operating switch device away from the clutch activated position when the first or motor operating switch device is in the motor deactivating position. The invention therefore prevents the clutch from being engaged before the motor is placed in operation.

The switch members are developed in known manner as deadman's handles, i.e. they return into their disconnect and disengagement position when released.

In accordance with one preferred embodiment of the invention, the switch members are developed as switch yokes and are swingably mounted on the guide handle of the mower so that the mower, in known manner, can be grasped at the same time as the switch yokes and the functions can be carried out without having to remove one's hands from the grip handle.

The switch function in accordance with the invention can be used in similar manner in a power mower driven by internal combustion engine, but it is preferably employed in an electric lawn mower in which the travel drive is effected by the same electric motor as drives the horizontally revolving blade.

One embodiment of the invention will be described below with reference to the drawing, in which:

FIG. 1 is a view of the handlebar of an electric lawn mower, seen from below,

FIG. 2 is a view of the handlebar of FIG. 1 seen in the direction of the arrow II, FIG. 3 is a view of the handlebar seen in the direction of the arrow III, FIG. 4 is a section along the line IV—IV of FIG. 1.

Figure 5:
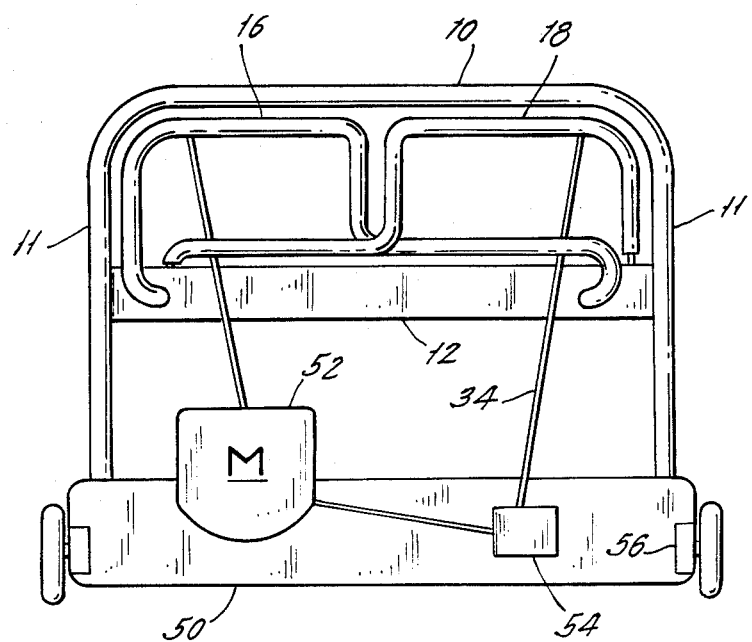
FIG. 5 is a schematic view of an electric power mower incorporating the present invention.

The handlebar consists of the grip bar 10 which passes into the two side bars 11 between which there is arranged a hollow cross member 12 which contains electric switches and connections, not shown in the drawing. On the top of the cross member there protrudes a safety button 14 which must be actuated before the motor switch member can be actuated. This motor switch member has a switch yoke or shackle 16 while the clutch switch member has a switch yoke or shackle 18 arranged adjacent to it, each of the yokes being gripped by a hand which rests on the handlebar and being adapted to be swung around its pivot axis 26 and 32 respectively, the axes being parallel to each other. Each switch yoke takes up approximately half the width of the handlebar 10 and each switch yoke 16 and 18 is provided with an extension 20 and 28 respectively which extends adjacent to the axis of swing of the yoke. The motor switch yoke 16 and its extension 20 are provided with bends 22 extending over 90° and 180° respectively, and the ends thereof are mounted for swinging around the axis 26 in bearing brackets 24 of the cross member 12. The limiting of the swing and the switch actuation are effected by elements (not shown in the drawing) which are arranged within the cross member. The end of the clutch switch yoke 18 adjacent the side bar 11 and the end of the extension 28 of the clutch switch yoke 18 are each capable of limited swinging around the axis 32 in respective bearings 30. A Bowden cable 34 is connected to the clutch switch yoke 18 and leads to the travel clutch, not shown in the drawing. As can be noted in particular from FIG. 1, the switch yokes in their central section overlap the sections of the extensions 20 and 28 respectively adjacent the bend, this in such a manner that the switch yoke 18 lies below the switvh yoke 16. This means that the switch yoke 16 for the motor switch can be actuated independently of the clutch switch yoke, while the clutch switch yoke can be actuated only when the switch yoke 16 is in connected position. Furthermore, the motor switch yoke 16 is held in engaged position by the clutch switch yoke 18 when said clutch switch yoke has effected the engagement of the travel drive.

Referring to FIG. 5, an electric power mower incorporating the present invention is shown. The mower includes a base 50 up from which the side bars 11 project to the grip handle 10. A conventional, power mower electric motor 52 is supported on the base 50. The motor 52 is coupled through the mechanical clutch 54 operated by the switch yoke 18 through the cable 34 with the travel drive 56 of the mower. The motor switch member or yoke 16 is connected with the motor 52 for actuating it.

The switch arrangement operates as follows:

In order to turn on the electric drive motor, after the safety button 14 has been depressed the switch yoke 16 is moved in the direction indicated by the arrow "a." Shortly before it strikes against the handlebar 10, a switch (not shown) which is integrated in the cross member is actuated. The mechanism is so designed that a slight opening of the hand, i.e. a short movement of the yoke 16 back in the direction indicated by the arrow "b", does not disconnect the motor. This is intended to prevent fatigue of the hand which is grasping the bar 10 and the yoke 16. If the yoke 16 is no longer grasped (and if the yoke 18 is not actuated), the motor connection yoke moves automatically, under spring force, in the direction "b" until it comes against the stop and disconnects the electric motor.

The switch can alternatively also be provided on the outside. Upon reconnection, the push button 14 must again be depressed. This safety-switch mechanism for the motor drive operates basically in the same manner as in Federal Republic of Germany Unexamined Application No. OS 30 33 346 and German Utility Model No. 81 08 936. In other words, the switch yoke 16 is locked in the position of rest, the lock can be opened by actuating the safety button 14, the switch yoke 16 can be swung after the opening of the lock and the connection thereby effected, the locking of the switch yoke 16 automatically entering into action again as soon as the electric switch has been opened after release of the switch yoke 16.

The connecting of the travel drive by the clutch switch yoke 18 can only be effected, due to the fact that the coupling switch yoke is developed as an entrainment lever (crossing of the yokes in the central region) when the motor is connected since otherwise the swinging of the clutch switch yoke 18 is blocked by the locked motor switch yoke 16. By means not shown in the drawing, it is seen to it that after the depressing of the safety button with one's left hand the motor switch cannot be connected by the clutch yoke with one's right hand. If both switch yokes 16 and 18 lie against the handlebar 10, then only the clutch switch yoke 18 need be held, so that one-handed operation is possible. If the travel drive is to be connected and disconnected when the lawn mower is used on difficult terrain, then the yoke 16 is held against the bar 10 by the left hand and the clutch switch yoke 18 can be moved independently between clutch position and unclutch position, so that precise operation is possible.

By the invention therefore the motor is definitely prevented from being connected while the travel drive is engaged since the connecting of the motor requires not only the pulling of the yoke 16 but also the actuating of the button 14 which is so arranged that it cannot be pushed with the hand which actuates the switch yoke 16. This means that the right hand must effect the unlocking by depressing the safety button 14, which can also not be actuated by the right hand if the latter has actuated the clutch switch yoke.

If the lawn mower is operated with one-hand operation and only the clutch switch yoke 18 is grasped with one or both hands, then, within the indicated safety swing-angle range during which the motor still remains connected, uncoupling can already take place and conversely also re-engagement while the motor is still operating. On the other hand, re-engagement is prevented after disconnection of the electric motor since in such case the safety button 14 must first of all be depressed.

I claim:

1. A motor driven lawn mower comprising a motor, a travel drive for being driven by the motor, a handlebar on the mower for being grasped;

a motor starting and operating first switch device connected with the motor and being movable to a first position for starting and operating the motor and being movable to a second position for stopping the motor, the first switch device being in the vicinity of the handlebar;

a clutch between the motor and the travel drive and a second switch device connected with the clutch and being movable to a third position for activating the clutch and being movable to a fourth position for deactivating the clutch, the second switch device being in the vicinity of the handlebar;

means normally returning the first switch device to the second position and the second switch device to the fourth position;

the second switch device being positioned for holding the first switch device in the first position when the second switch device is in the third position, whereby when the clutch is activated, the motor is switched to be operating; and the first switch device being positioned for holding the second switch device away from the third position and toward the fourth position when the first switch device is in the second position, whereby when the motor is switched to be stopped, the clutch is deactivated.

2. The lawn mower of claim 1, wherein the first and second switch devices respectively comprise first and second yokes movable in relation to the handlebar between their respective positions and the yokes are shaped to interfere with the passage of one yoke past the other as they move between their positions.

3. The lawn mower of claim 2, wherein the switch devices are both pivotally supported to the mower to pivot between their respective positions and with respect to the handlebar.

4. The lawn mower of claim 3, wherein the yokes are positioned adjacent to each other.

5. The lawn mower of claim 4, wherein each yoke extends over about one-half of the length of the handlebar.

6. The lawn mower of claim 1, wherein there is sufficient play in the first position of the first switch device that a slight release of pressure on the first shift device while it is at the first position, which enables the means for returning the first switch device to act on the first switch device for causing a slight return of the first switch device, does not turn the motor off.

7. The lawn mower of claim 5, wherein each yoke includes an extension that extends from about the middle of the handlebar to about a respective end of the handlebar, the extensions of the yokes overlapping in the vicinity of the middle of the handlebar for interfering with the passage of one yoke past the other yoke.

8. The lower mower of claim 7, wherein the yokes have respective parallel pivot axes on the mower and the yokes are pivotable to a limited extent about their pivot axes between their respective positions.

9. The lawn mower of claim 1, wherein the lawn mower motor is electrically powered.

10. The lawn mower of claim 9, further comprising lateral struts connected to the handlebar and extending to the mower for supporting the handlebar on the mower;, a crosspiece extending between the lateral struts; the yokes being mounted laterally of the crosspiece.

11. The lawn mower of claim 10, further comprising a safety switch supported on the crosspiece, the safety switch being connected with the motor so that the safety switch must first be actuated before the motor can be actuated by the first switch device.

12. The lawn mower of claim 11, wherein the safety switch is spaced sufficiently far from both of the first and second switch devices that the safety sensor cannot be activated by an operator's hand when it is moving one of the first and second switch devices.

13. The lawn mower of claim 12, wherein the crosspiece is below the handlebar and the crosspiece has a top side, the safety switch being on the top side of the crosspiece.

14. The lawn mower of claim 9, further comprising a safety switch connected with the motor so that the safety switch must first be actuated before the motor can be actuated by the first shift device.

* * * * *